United States Patent [19]

Kuwahata et al.

[11] Patent Number: 4,559,584

[45] Date of Patent: Dec. 17, 1985

[54] COMBINATION LIGHTING DEVICE AND LOUDSPEAKER

[75] Inventors: Toshikatsu Kuwahata; Fumio Kawabata, both of Tokyo; Genzo Kurosawa, Yamato, all of Japan

[73] Assignee: Victor Company of Japan, Limited, Yokohama, Japan

[21] Appl. No.: 608,020

[22] Filed: May 3, 1984

[51] Int. Cl.[4] ........................................ H04M 1/22

[52] U.S. Cl. ................................ 362/86; 362/216; 362/370; 362/217; 362/374; 362/253; 362/375; 381/87

[58] Field of Search ................ 362/86, 147, 216, 217, 362/225, 370, 374, 375, 811, 253; 381/87, 88

[56] References Cited

U.S. PATENT DOCUMENTS

| | | | |
|---|---|---|---|
| 1,272,843 | 7/1918 | Pape | 362/86 X |
| 1,654,068 | 12/1927 | Blattner | 362/811 X |
| 2,501,968 | 3/1950 | Sassin | 362/86 X |
| 3,023,830 | 3/1962 | Hammes | 362/86 X |
| 3,194,952 | 7/1965 | Wells | 362/86 |
| 3,478,837 | 11/1969 | Ross | 362/86 X |
| 4,403,278 | 9/1983 | Flood | 362/370 X |
| 4,433,363 | 2/1984 | Weber | 362/147 X |
| 4,441,143 | 4/1984 | Richardson, Jr. | 362/147 X |

*Primary Examiner*—Peter A. Nelson

*Attorney, Agent, or Firm*—Lowe, King, Price & Becker

[57] ABSTRACT

A lighting device incorporates therein a loudspeaker including a diaphragm detachably fastened at an outer peripheral edge thereof to a cup-shaped frame. The diaphragm is made of a light-transmissive material. The lighting device has a light source such as a circular fluorescent lamp disposed in a space defined between the frame and the diaphragm. Light emitted from the circular fluorescent lamp passes through the light-transmissive diaphragm.

11 Claims, 3 Drawing Figures

COMBINATION LIGHTING DEVICE AND LOUDSPEAKER

BACKGROUND OF THE INVENTION

The present invention relates to a lighting device with a loudspeaker incorporated therein.

Hotels, business office buildings, public schools, etc. generally have emergency or fire exits that are indicated by lighted lamps. Such buildings also have a system of loudspeakers for announcing information to people in the building.

In an emergency, e.g. a fire, the lighted lamps are supposed to guide occupants to the emergency exits. However, they often fail to be as effective as expected due primarily to the smoke obscuring visibility and a possible power failure. One preferable solution would be to announce the location of the emergency exits through the system of loudspeakers. In this respect, it would be particularly advantageous if the oral announcement came from where the emergency exits are located since people could relatively easily reach the exits even in the dark simply by following the direction in which the announcement is heard.

Halls, restaurants, stores, and other public buildings for entertainment use have lighting devices mounted on ceilings and/or walls for lighting the interior of the rooms and also loudspeakers mounted on ceilings and/or walls chiefly for providing music to entertain customers. Modern interior design trends are such that the loudspeakers be kept as inconspicuous as possible to provide easier and better interior decoration and also to leave people unaware of the source of mood music.

SUMMARY OF THE INVENTION

It is an object of the present invention to provide a combination lighting device and loudspeaker.

Another object of the present invention is to provide a lighting device with a loudspeaker incorporated therein and having a diaphragm doubling as a loudspeaker cone and a light-transmissive protective cover of the lighting device.

Still another object of the present invention is to provide a lighting device with a loudspeaker incorporated therein and having a diaphragm detachably mounted on a frame for replacement or repair of the diaphram and/or a lamp.

A still further object of the present invention is to provide a light device and loudspeaker assembly which is inexpensive to manufacture.

According to the present invention, a lighting device and loudspeaker assembly comprises a frame having a bottom and a sidewall, a loudspeaker unit mounted on the frame bottom and having a diaphragm supported on the frame sidewall for producing sound and made of a light-transmissive material, and a light source such as a circular fluorescent lamp supported on the frame sidewall and positioned between the frame bottom and the diaphragm for emitting light through the diaphragm. The diaphragm has a central portion and an outer peripheral edge detachably fastened to a voice coil of the loudspeaker unit and the frame sidewall, respectively.

The above and other objects, features and advantages of the present invention will become more apparent from the following description when taken in conjunction with the accompanying drawing in which preferred embodiments of the present invention are shown by way of illustrative example.

DETAILED DESCRIPTION

Figure 1:
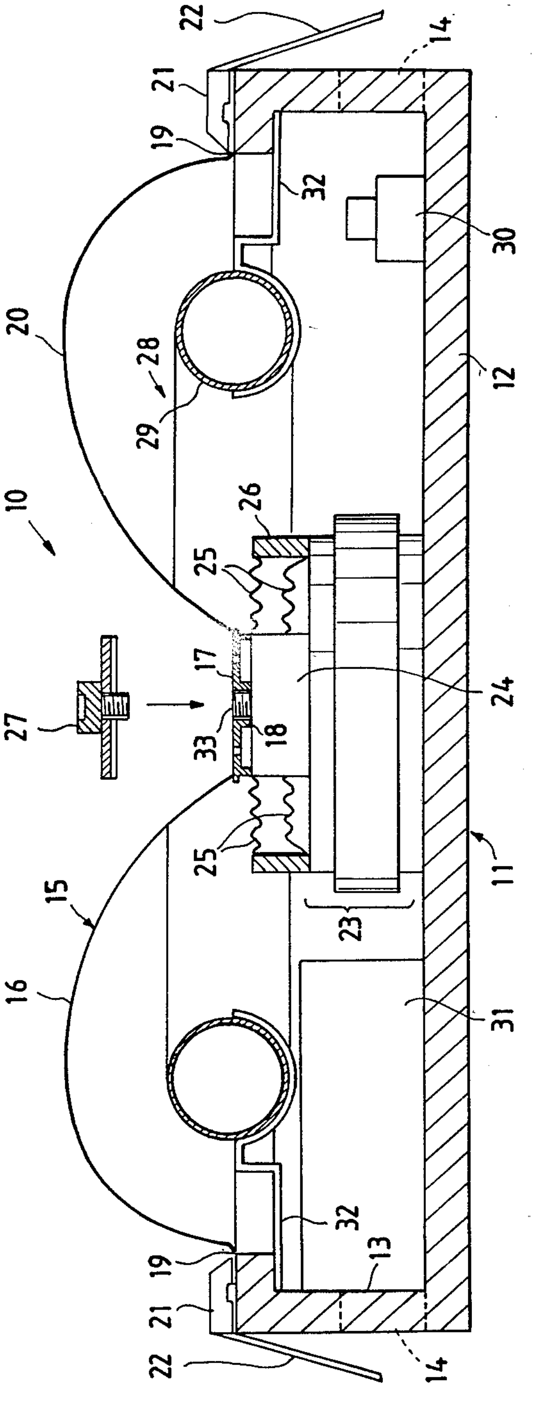
FIG. 1 is a cross-sectional view of a combination lighting device and loudspeaker according to an embodiment of the present invention.

As shown in FIG. 1, a lighting device and loudspeaker assembly, generally indicated by the reference numeral 10, comprises a substantially cup-shaped frame 11 having a bottom 12 and an outer peripheral flange or sidewall 13 extending around the bottom 12. The sidewall 13 has a plurality of circumferentially spaced holes 14.

A loudspeaker unit, generally denoted at 15, is mounted on the frame bottom 12 and includes a substantially doughnut-shaped, hollow diaphragm 16 having a central portion 17 and an outer peripheral edge 19. The doughnut-shaped diaphragm 16 also includes an annular bulging or convex web 20 extending radially inwardly of the outer peripheral edge 19 and projecting away from the frame bottom 12. The diaphragm 16 is made of an inflammable light-transmissive material, typically, polyolefins such as polypropylene containing an inorganic substance such as ceramic. The material of the diaphragm 16 has excellent acoustic properties such as propagation speed and internal loss, and is light-transmissive such as transparent or translucent. The material of the diaphragm 16 is also of an increased mechanical strength and can be molded to shape with ease and in a desired color. The outer edge 19 of the diaphragm 16 is detachably fastened by a plurality of suitable fasteners 21 to an end surface of the sidewall 13 facing away from the frame bottom 12, the fasteners 21 being located at circumferentially spaced locations thereon. Light shields 22 are attached to the frame sidewall 13 in partially covering relation to the holes 14.

The loudspeaker unit 15 also has a magnet assembly 23 providing a magnetic circuit and mounted on the frame bottom 12. A tubular voice coil bobbin or former 24 is disposed movably around the central post 20 in coaxial relation therewith and has a central attachment member 18 disposed below the central portion 17 of the diaphragm 16, the central attachment member 18 having an internally threaded hole 33. The voice coil bobbin 24 is supported by a damper or centering spider 25 attached to a support ring 26 of the magnet assembly 23. The voice coil bobbin 24 supports thereon a voice coil (not shown) disposed in a gap (not shown) in the magnet assembly 23 and electrically connected to an amplifier (not shown). The central portion 17 of the diaphragm 16 is detachably fastened to the central attachment member 18 by a screw 27 extending through the central portion 17 threadedly into the internally threaded hole 33.

By removing the fasteners 21 and the screw 27, the diaphragm 16 can easily be detached from the frame sidewall 13 and the voice coil bobbin 24 for repair of the diaphragm 16 or replacement with a new diaphragm or another diaphragm having a different color.

When a signal current flows through the voice coil, the voice coil bobbin 23 is moved axially back and forth to vibrate the diaphragm 16 back and forth to produce sound.

A lighting device, generally indicated at 28, includes a circular fluorescent lamp 29, a glow lamp 30, and a ballast 31 which are electrically interconnected to each other and to a power supply (not shown) in a conventional fashion. The fluorescent lamp 29 is supported by arms 32 fastened to the frame sidewall 13 and positioned in a space behind the diaphragm 16 or between the frame bottom 12 and the diaphragm 16. More specifically, the fluorescent lamp 29 is partly disposed in the annular convex web 20 of the diagragm 16. When the fluorescent lamp 29 is energized, light emitted therefrom passes through the light-transmissive diaphragm 16 in the upward direction (as shown in FIG. 1).

With the foregoing arangement, the light-transmissive diaphragm 16 doubles as a speaker cone and a protective cover for the fluorescent lamp 29 to conceal the same and make light emitted from the fluorescent lamp 29 less intensive, i.e., soft. Therefore, the combination lighting device and loudspeaker 10 is inexpensive to manufacture. Since the diaphragm 16 can be detached, the fluorescent lamp 29 can also be removed for replacement or repair.

The frame 11 doubles as a loudspeaker cabinet or enclosure and a protective cover for the fluorescent lamp 29, the glow lamp 30, and the ballast 31. The frame 11 as the loudspeaker cabinet gives the loudspeaker unit an acoustic load for preventing phase interference while allowing reproduction of low frequency sound. The sound absorbent bodies 41 are also effective to assist in reproducing sounds of low frequencies. In the case where the lighting device and loudspeaker assembly is mounted on a ceiling or wall by the frame wall 12, the ceiling or wall serves as a baffle for better sound reproduction at lower frequencies. Another possible use of the lighting device and loudspeaker assembly is as a desktop lighting and loudspeaker assembly with a stand attached to the frame 11.

Since the loudspeaker unit, particularly the diaphragm 16, is not positioned within the frame 11, there is no problem of producing unclear confined sounds which would otherwise be given off if the diaphragm were located in the frame. Accordingly, the loudspeaker unit as assembled in the lighting device is free from undesirable functional disadvantages.

Because the diaphragm 16 is made of an inflammable light-transmissive synthetic resin, it can be molded easily on a mass-production basis. The diaphragm 16 can be shaped to various designs and in various colors. The quality of sound produced by the diaphragm 16 and its ability to transmit light therethrough can be controlled as desired by selecting an additive to be mixed in the synthetic resin material of the diaphragm.

The holes 14 in the frame sidewall 13 serve to ventilate the assembly 10 for preventing excessive heat buildup in the space between the diaphragm 16 and the frame 11. Light emitted by the fluorescent lamp 29 out of the sidewall 13 through the holes 14 is blocked by the light shields 22 against direct radiation toward viewer's eyes.

Figure 2:
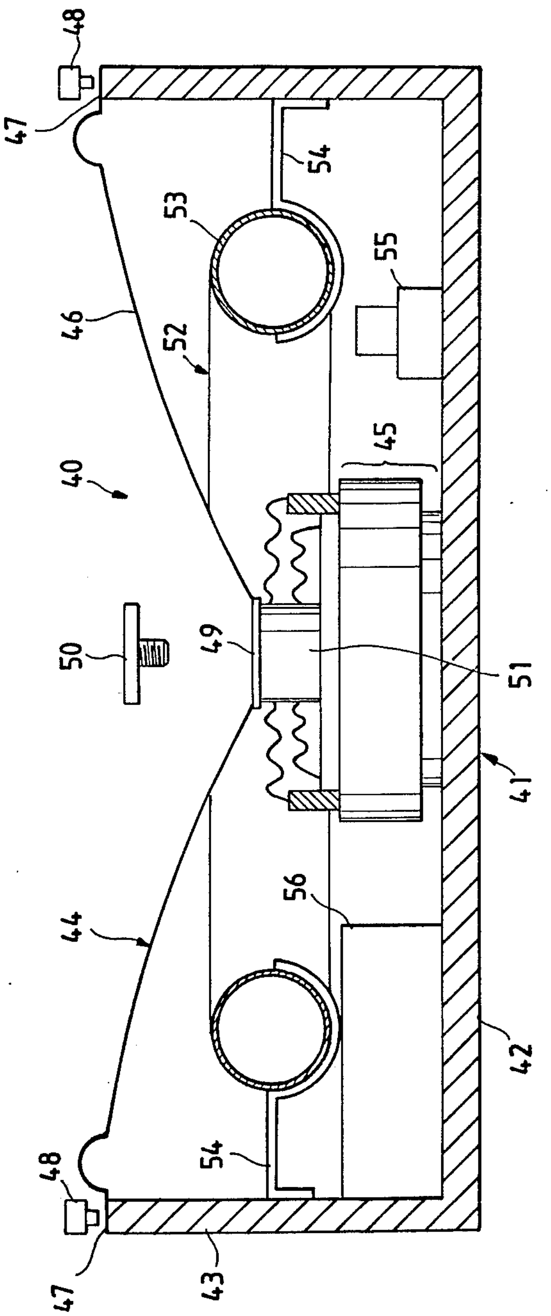
FIG. 2 is a cross-sectional view of a combination lighting device and loudspeaker according to another embodiment of the present invention.

FIG. 2 illustrates a lighting device and loudspeaker assembly 40 according to another embodiment of the present invention. The lighting device and loudspeaker assembly 40 includes a cup-shaped frame 41 composed of a bottom 42 and a sidewall 43, and a loudspeaker unit 44 having a magnet assembly 45 mounted on the frame bottom 42 and a light-transmissive diaphragm 46 having an outer peripheral edge 47 detachably fastened by screws 48 to an end surface of the the frame sidewall 43 and a central attachment portion 49 detachably fastened by a screw 50 to a voice coil bobbin 51. The diaphragm 46 is substantially cone-shaped with the central attachment portion 49 located more closely than the outer peripheral edge 47 to the frame bottom 42. A lighting device 52 includes a circular fluorescent lamp 53 disposed within the cup-shaped frame 41 and positioned in a space behind the diaphragm 46, or between the diaphragm 46 and the frame bottom 42. The fluorescent lamp 53 is supported by arms 54 on the frame sidewall 43 and electrically connected to a glow lamp 55 and a ballast 56 mounted on the frame bottom 42.

Figure 3:
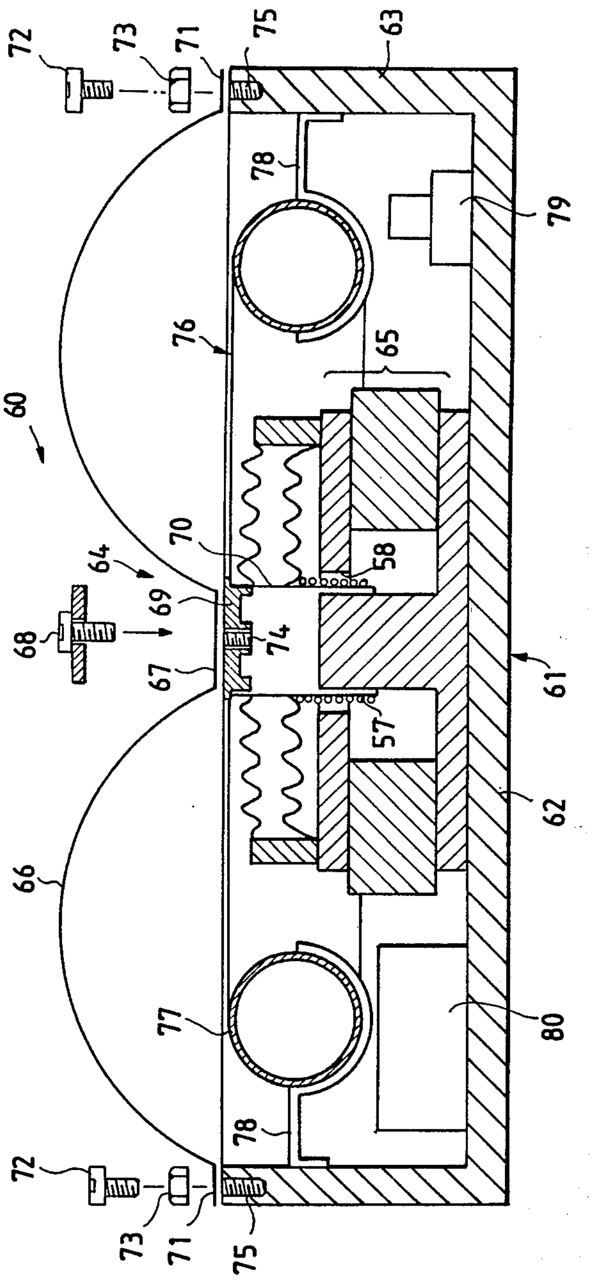
FIG. 3 is a cross-sectional view of a combination lighting device and loudspeaker according to still another embodiment of the present invention.

According to still another embodiment shown in FIG. 3, a lighting device and loudspeaker assembly 60 is of essentially the same construction as that of the assembly illustrated in FIG. 1. The assembly 60 includes a cup-shaped frame 61 having a bottom 62 and a sidewall 63, and a loudspeaker unit 64 having a magnetic assembly 65 mounted on the frame bottom 62 and a light-transmissive diaphragm 66. The diaphragm 66 includes a central portion 67 detachably fastened by a screw 68 to an attachment member 69 fixed to a voice coil bobbin 70 and an outer peripheral edge 71 detachably fastened by screws 72 and nuts 73 to an end surface of the frame sidewall 63. The screw 68 is detachably threaded in an internally threaded hole 74 in the attachment 69, and the screws 72 are detachably threaded in internally threaded holes 75 in the frame sidewall 63. The voice coil bobbin 70 supports thereon a voice coil 57 movably disposed in a gap 58 in the magnet assembly 65. The assembly 60 also includes a lighting device 76 composed of a circular fluorescent lamp 77 disposed within the frame 61 behind the diaphragm 66 and supported by arms 78 on the frame sidewall 63. The fluorescent lamp 77 is electrically connected to a glow lamp 79 and a ballast 80.

The light source, which has been illustrated as being a fluorescent lamp in each of the foregoing embodiments, may comprise a plurality of small-size incandescent lamps of limited wattage so as to give off a reduced amount of heat that fails to develop an undesired heat buildup in the lighting device and loudspeaker assembly while the assembly is being energized for a prolonged period of time. Where such incandescent lamps are employed, the glow lamp and the ballast may be dispensed with.

Although certain preferred embodiments of the present invention have been shown and described in detail, it should be understood that various changes and modifications may be made therein without departing from the scope of the appended claims.

What is claimed is:

1. A lighting device and loudspeaker assembly comprising:
   (a) a frame;
   (b) a loudspeaker unit having a diaphragm mounted on said frame for producing sound, said diaphragm being made of a light-transmissive material; and
   (c) a light source disposed in a space defined between said frame and said diaphragm for emitting light through said diaphragm, said diaphragm extending to cover said light source so that light emitted from said source is diffused by passing through said diaphragm into a room and the like in which said assembly is located.

2. A lighting device and loudspeaker assembly according to claim 1, wherein said frame is of a substantially cup-shaped configuration including a bottom and a sidewall extending around said bottom, said diaphragm having an outer peripheral edge detachably fastened to said sidewall to substantially entirely enclose said space in which said light source is disposed.

3. A lighting device and loudspeaker assembly according to claim 2, wherein said sidewall has an end surface facing away from said bottom, further including a plurality of fasteners by which said outer peripheral edge of the diaphragm is detachably attached to said end surface.

4. A lighting device and loudspeaker assembly according to claim 3, wherein said fasteners comprise screws, said sidewall having internally threaded holes in which said screws are threaded.

5. A lighting device and loudspeaker assembly according to claim 3, wherein said loudspeaker unit comprises a magnet assembly having a gap and a voice coil bobbin supporting a voice coil movably disposed in said gap, said voice coil bobbin supporting an attachment member, said diaphragm having a central portion detachably fastened by a screw to said attachment member.

6. A lighting device and loudspeaker assembly according to claim 2, wherein said diaphragm includes an annular convex web extending radially inwardly of said outer peripheral edge and projecting away from said bottom.

7. A lighting device and loudspeaker assembly according to claim 2, wherein said diaphragm is substantially cone-shaped and has a central portion disposed closer than said outer peripheral edge to said bottom.

8. A lighting device and loudspeaker assembly according to claim 2, wherein said light source comprises a circular fluorescent lamp disposed substantially in said cup-shaped frame.

9. A lighting device and loudspeaker assembly according to claim 8, including a plurality of arms by which said circular fluorescent lamp is supported on said sidewall.

10. The assembly of claim 2, wherein said sidewall is formed with ventilation holes to prevent excessive heat buildup in said space formed between said diaphragm and frame, and further including light shield members covering said holes to prevent light emitted through said holes from radiating directly into a viewer's eyes.

11. The assembly of claim 2, further including means for mounting said device so that the diaphragm is disposed at a lowermost position with respect to the remainder of said device so that both light and sound is transmitted through the diaphragm.

* * * * *